United States Patent [19]

De Bruine

[11] 3,970,840
[45] July 20, 1976

[54] CONTROL CIRCUITRY FOR VEHICLE GUIDANCE MECHANISM

[75] Inventor: Carl De Bruine, Grand Rapids, Mich.

[73] Assignee: Lear Siegler, Inc., Santa Monica, Calif.

[22] Filed: July 16, 1974

[21] Appl. No.: 488,961

[52] U.S. Cl. .......................... 250/202; 250/214 AG; 250/214 B; 318/577
[51] Int. Cl.² .......................................... G05B 1/01
[58] Field of Search ............. 250/202, 209, 214 AG, 250/214 B; 318/577

[56] References Cited
UNITED STATES PATENTS

| | | | |
|---|---|---|---|
| 2,996,621 | 8/1961 | Barrett, Jr. | 250/202 |
| 3,718,821 | 2/1973 | Vishulis | 250/202 |
| 3,739,177 | 6/1973 | Ko | 250/214 B |

*Primary Examiner*—Eugene La Roche
*Attorney, Agent, or Firm*—McGarry & Waters

[57] ABSTRACT

A vehicle guidance mechanism for guiding a vehicle along a guide line comprises a radiation source that causes the guide line to reflect or emit a guidance signal; photocell sensors mounted in the vehicle and adapted to sense the guidance signal and produce an error output signal proportional to the variation of vehicle position from a predetermined lateral position with respect to the guide line; and a control device in the vehicle adapted to steer the vehicle in response to the error signal so as to cause the vehicle to follow the guide line. An automatic contrast or gain control circuit eliminates the effect of background illumination in the output signal received from the guide line. Modulation circuitry and appropriate filters reduce the effects of static background illumination and improve the reliability and line detecting ability of the guide system. Line detection circuitry is employed to prevent operation of the automatic control device unless the vehicle is tracking a valid guide line.

8 Claims, 12 Drawing Figures

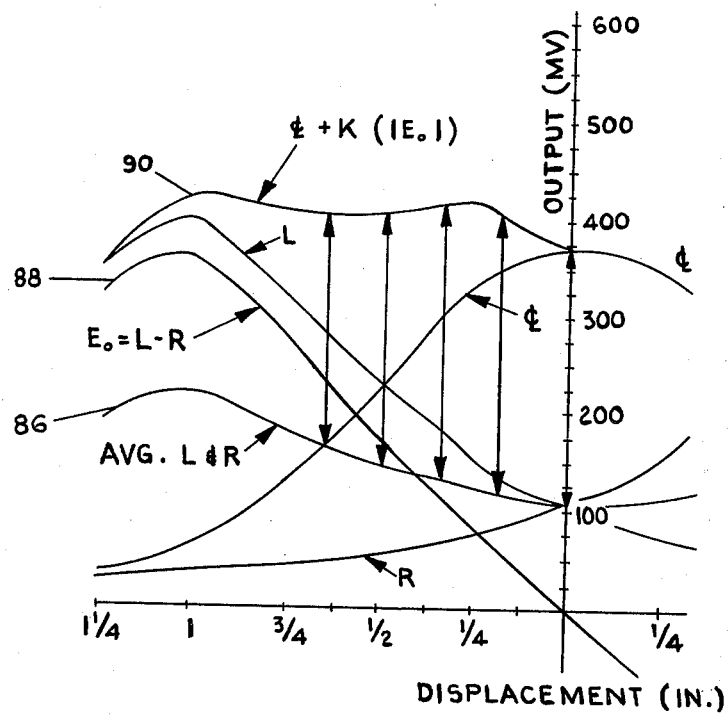
FIG. 8
FIG. 7
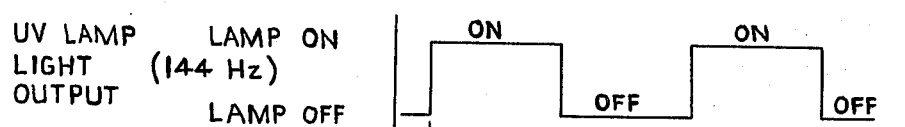
FIG. 7a
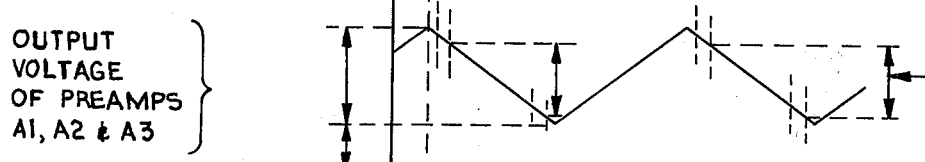
FIG. 7b
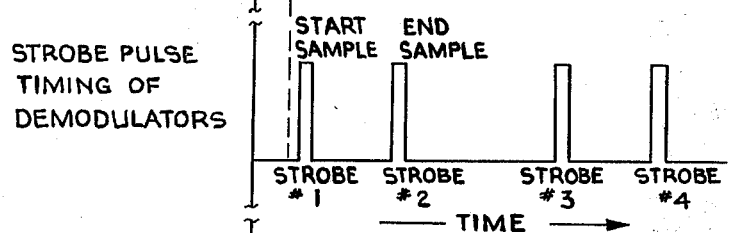
FIG. 7c
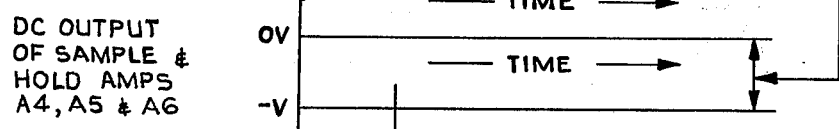
FIG. 7d
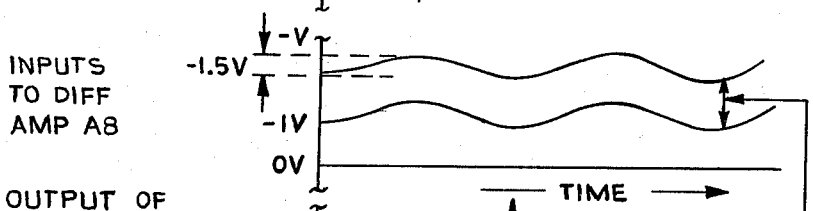
FIG. 7e
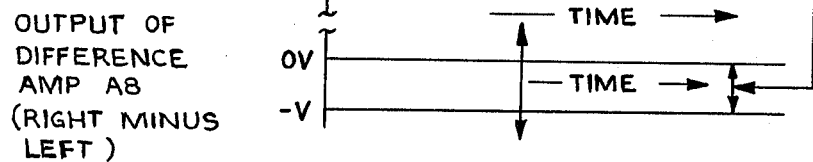
FIG. 7f

CONTROL CIRCUITRY FOR VEHICLE GUIDANCE MECHANISM

BACKGROUND OF THE INVENTION

1. Field of the Invention

This invention relates to line tracking systems for automatically directing a vehicle along a predetermined path and more particularly to a control circuitry for a line tracking system capable of tracking an invisible guide line.

2. Description of the Prior Art

A variety of automatic control devices for vehicles have previously been developed. The principal use for such automatic guidance systems has been in connection with industrial vehicles of the type that perform delivery or work functions in an industrial or office facility. Systems also have been developed for automobile guidance on highways but no such systems have been implemented on a commercial basis.

The basic types of guidance systems previously used on unmanned industrial vehicles have been permanent tracks, buried wire, reflected light, and radio controlled.

Track vehicles are vehicles that ride along a fixed rail or a track and are guided by the contour of the track. These vehicles are used primarily for automated storage-retrieval systems such as lift trucks that move on tracks between many-leveled storage racks and stock or retrieve material under computer control. This technique is unacceptable for floor maintenance machines (i.e., machines that scrub, sweep, or vacuum a floor) or any other application except for highly structured environments, such as stadiums, theaters, or stairwells. The presence of a fixed or permanent track on many floor surfaces is aesthetically as well as physically undesirable, and the installation of such a track is a substantial expense. Further, when a permanent track is installed, it is difficult and expensive to change the location of the track, thereby reducing the flexibility of the system.

Buried wire guidance systems have been applied successfully to various material handling systems, including hospital food trays, office mail carts, and automotive parts for use on assembly lines. In such a system, a wire is buried in the floor along the track the vehicle is to follow, and both ends of the wire are terminated at an excitation source. The wire is excited with an alternating current (typically 10 kHz) and its radiation pattern is then detected by two sensing coils on the vehicle. The differential output of these coils is utilized to drive a steering mechanism so that the vehicle is steered to follow the buried wire. This technique has serious limitations, one of the principal limitations beeing that it is generally not practical to employ a buried wire system in an existing structure. To apply a buried wire system to an existing floor structure, it would be necessary to cut a long groove in the floor structure along the path the vehicle is to follow and lay a new floor surface over the wire after it is buried in the groove. Even if the expense of burying a wire in an existing floor structure could be justified for a given application, the system would lack flexibility because to change the position of any given line, it would be necessary to cut a new groove in the floor and lay a new wire in this groove, while at the same time disconnecting the old wire.

Other disadvantages with a buried wire system are that the materials are relatively expensive, as well as being difficult to install and remove, and interference problems could be encountered when a buried wire system is used in a floor that is heavily reinforced with metal reinforcing rods.

Buried wire guidance systems are not appropriate for floor care machines for all of these reasons—they are too expensive, and the system contains little flexibility with regard to changing the placement of the guide line.

In reflected light sensing systems, a brightly visible line that contrasts markedly with the surface of the floor is laid along a predetermined path to be followed by the vehicle. The vehicle includes a light source of visible light that shines on the floor and photocell sensors that detect the level of light reflected from the floor (i.e., both the background and guide line illumination). The sensors are connected to a differential output amplifier much in the manner of the sensing coils in the buried wire system. The differential output is connected to a servo drive mechanism, which steers the vehicle along the guide line as the vehicle moves along the floor. One of the problems with the reflected light system is that the background or spurious illumination from the floor also is received by the photocells, and this illumination impairs the ability of the system to detect the contrast between the guide line and the background illumination. With surfaces having different contrast levels, such as a tile surface employing black and white checkered tiles, accurate tracking with a reflected light sensing system is unreliable.

Indeed, reflected light guidance systems have been known to cause a vehicle to follow a beam of sunlight that is cast across a floor surface from a window. Such unreliability is a critical defect in automatic machines because unreliable machines require constant supervision (thus eliminating labor cost savings), and an unmanned machine out of control on a spurious or nonexistent line can be extremely hazardous.

One of the positive attributes of a reflected light system is that an existing line can be removed or moved to a new location easily, thus defining a new guide line for the vehicle to follow. However, the very impermanence and visibility of such a guide line also has drawback. A visible and removable guide line invites vandalism, and such guide lines are aesthetically unappealing. The aesthetic unacceptability along is fatal to the use of a reflected light system in many applications, one of which is in the floor care industry. It would be completely unacceptable to almost any operation to have a complete matrix of highly visible lines crisscrossing on the floor surface just so that a floor scrubber or a floor sweeper could be operated automatically.

Another problem with a reflected light tracking system is that such systems are effectively limited to use on hard, flat surfaces, such as concrete or tile. Problems with obtaining the necessary reflectance levels and with the aesthetic undesirability of a solid, bright visible line on a carpet would prevent the application of such a system in any such environment.

Notwithstanding the fact that the visible line system and the other systems designed above have been in existence for many years (visible line systems having been in existence since at least 1937) heretofore no system has been developed which obviates the disadvantages of the three systems discussed above and provides a suitable automatic guidance system for use in connection with floor care machinery or other types of machinery, wherein a high degree of system reliability is essential, and system flexibility for rerouting the guide path and line invisibility are at least desirable. It is a principal object of the present invention to provide an automatic guidance system for a vehicle that is highly reliable, and is capable of following a guide line that is substantially invisible under normal ambient lighting conditions, and can be applied and reapplied easily to the surface of an existing floor.

SUMMARY OF THE INVENTION

The present invention comprises an improved control circuit for a vehicle guidance mechanism for automatically guiding a vehicle along a guide line. The vehicle guidance system comprises a radiation source that causes the guide line to emit or reflect a guidance signal; sensor circuitry that senses the guidance signal and generates an error signal proportion to the vairation of the vehicle position from a predetermined lateral position with respect to the guide line; and a control mechanism that steers the vehicle along the guide line in response to the error signal generated by the sensor mechanism.

In order to improve the effectiveness and reliability of the guidance system of the present invention, several important features are incorporated in the sensor control circuit for this system. One of the features is a modulation circuit that eliminates the effect of static background radiation from the sensor output signal. This circuit first modulates the radiation source with a predetermined modulation signal to distinguish the guidance signal produced by the radiation source from background radiation sources. The modulation circuit then demodulates the sensor output signal so as to limit the error signal to the signal produced by the radiation source alone, eliminating the effect of both the static background radiation and the modulation signal from the error output signal.

Another important feature of the control circuitry is an automatic gain control circuit that maintains, by means of approximate feedback signals, a constant ratio between error output voltage and vehicle displacement from the center of the guide line regardless of the level of background illumination. In the present system, the guidance signal is detected by sensors at three separate positions, to the left and right sides of the guide line and directly above the guide line. To maintain gain control independent of the effect of background radiation, these sensors are positioned so that they each receive approximately the same amount of background radiation when the sensing mechanism is centered over the guide line, and the gain control circuit maintains a constant difference between the output signal from the center sensor and either the left or right sensors (or preferably the average signal from the left and right sensors) when the sensing mechanism is centered over the guide line. The difference signal eliminates the effect of background radiation and produces a signal representative of the position of the guide line with respect to the sensing positions. The center position signal can be modified by adding to it the absolute value of the difference between the left and right sensor signals, in order to maintain a relatively constant output gain even when there is substantial variations of the sensing mechanism from its centered position over the guide line.

Still another important aspect of the present invention is the employment of improved line detection circuitry for preventing operation of the vehicle in the absence of a valid guide line. The existance of a positive difference in the output signals between the center sensor and the left and right sensors in the presence of a valid line serves as the basis for the line detection circuits. A separate line detection circuit can be employed for detecting this difference or the feedback signal from the gain control circuit can be employed for detecting a valid line. Appropriate circuits can also be included to compensate for line brightness and to limit a valid line indication to situations where the guide line is no more than a predetermined distance from being centered.

The control mechanism also includes a filter network for limiting guidance response to radiation emitted by the guide line; and automatic stop circuitry for stopping the vehicle whenever the vehicle comes in contact with an obstacle in the path.

Each of the foregoing features is an important aspect of the presnt invention and provides substantial benefits in improving the reliability and line tracking ability of the present invention. These features minimize adverse effects caused by variations in background illumination, line brightness, contrast between guide line and background surfaces, variations in stimulation radiation levels, and other factors which may cause improper performance of an automatically controlled vehicle.

The control circuit of the present invention can be used advantageously in almost any type of automatic vehicle guidance system for causing a vehicle to follow a guide line capable of emitting or reflecting a guidance signal. However, the present invention is particularly well adapted for use in connection with an invisible line following guidance system designed for industrial vehicles that are used in delivery or floor maintenance applications, such as floor scrubbers, floor sweepers, vacuum cleaners, and the like. The present invention provides for the first time control circuitry for an automatic guidance mechanism that is highly reliable and is well suited for floor maintenance applications, thus permitting considerable cost savings in floor maintenance expense. With an automatic floor maintenance machine employing the tracking system of the present invention, a floor scrubber can be actuated by pressing a single button at the entranceway to a large convention hall, and the scrubber will automatically follow a predetermined yet invisible path back and forth across the entire convention hall floor and then turn itself off at the end of the job without the intervention of an operator for the entire process. The machine can be programmed to turn sharp corners, go around any obstacles, or take any other course or path that may be desired. The automatic stop circuitry automatically stops the vehicle when it comes in contact with physical obstruction (e.g., a wastebasket) placed in its way as it moves along the guide line.

These and other advantages and features of the present invention will hereinafter appear. For purposes of illustration, but not of limitation, a preferred embodiment of the present invention is described below and shown in the appended drawings.

BRIEF DESCRIPTION OF THE DRAWINGS

FIG. 7 is a schematic graph showing amplifier output wave forms at various points in the sensor circuitry.

FIG. 8 is a schematic graph showing sensor output voltage as a function of the displacement of the guide line away from a position directly below the center sensor.

DETAILED DESCRIPTION OF PREFERRED EMBODIMENT

Figure 1:
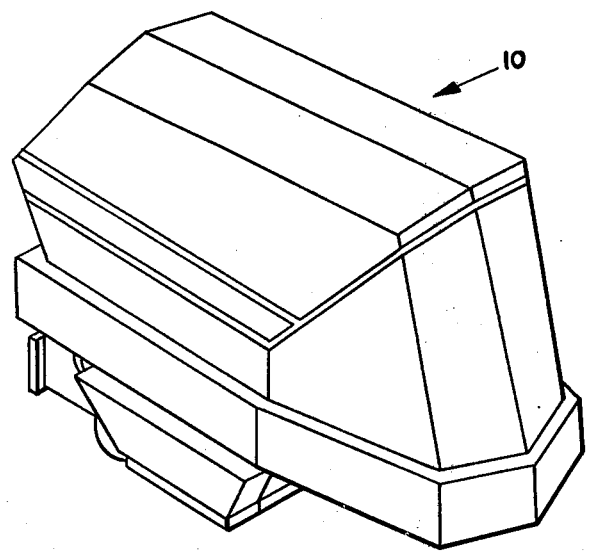
FIG. 1 is a perspective view of a vehicle, an automated floor scrubbing machine, embodying the guidance system of the present invention.

Referring now to the drawings, a vehicle 10 in the nature of a floor maintenance machine designed for scrubbing and cleaning a floor is shown in FIG. 1. The principles of the guidance system of the present invention can be employed with any type of vehicle that is adapted to be steered along a path on a surface, but for exemplary purposes, the description herein will refer only to floor maintenance machinery, more particularly to a floor scrubber.

Figure 2:
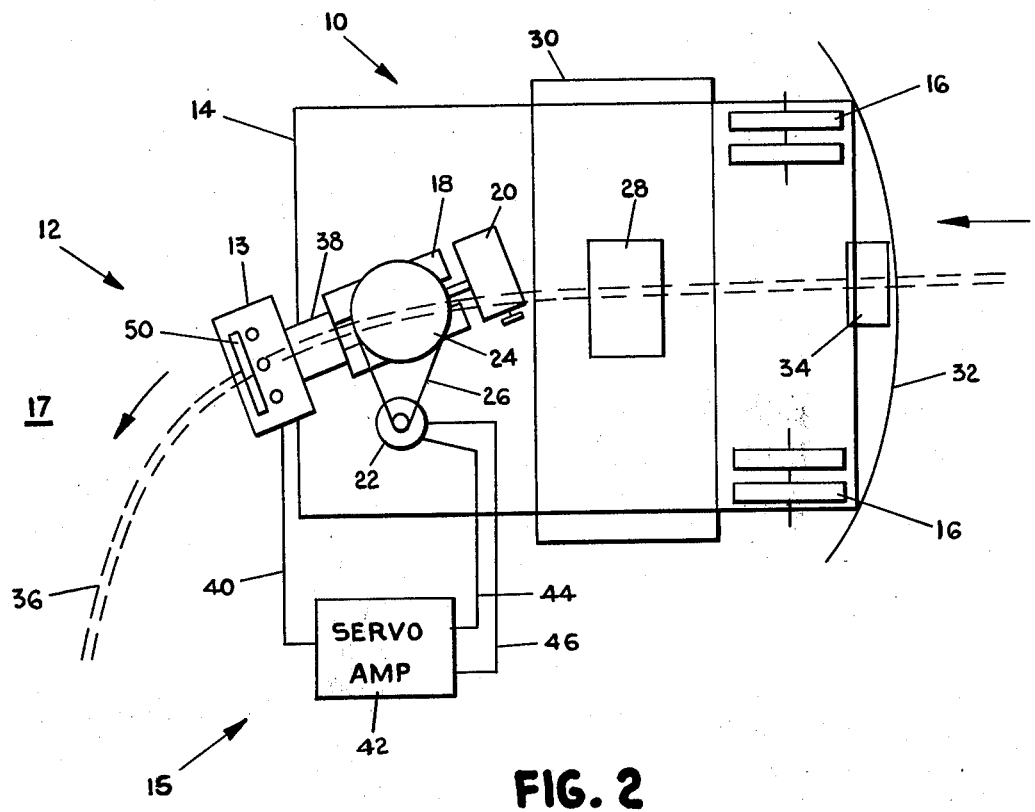
FIG. 2 is a schematic plan view of the floor scrubber shown in FIG. 1, showing the guidance system of the present invention in block form.

A schematic plan view of floor scrubber 10, showing the various components of the floor scrubber and an automatic vehicle guidance system 12 constructed in accordance with the present invention, is shown in FIG. 2. The various components of the floor scrubber itself are conventional and are shown in block form for illustration purposes only.

The conventional aspects of floor scrubber 10 include a frame 14 that rests on a tricycle running gear comprising a pair of parallel, spaced rear wheels 16 and a pivotable front wheel 18. Each of these wheels may comprise a pair of closely spaced wheels (as shown in the drawing) instead of a single wheel. The vehicle is driven by means of a drive motor 20 that drives wheel 18 by a suitable chain drive mechanism or the like. Manual steering of the vehicle may be effected by an operator riding the vehicle who pivots wheel 18 about its vertical axis by means of a steering wheel and suitable gears (not shown).

For purposes of cleaning floors, floor scrubber 10 includes a solution feed mechanism 28 that feeds a detergent-containing solution to the floor, a brush mechanism 30 that scrubs the floor with the solution, a squeegee 32 that wipes the cleaning solution from the floor after the brushes have scrubbed the floor, and a vacuum device 34 that sucks the dirty water from the floor and transports it to a suitable holding container.

Guide Line

In order to provide a suitable path for the automatic guidance system 12 of floor scrubber 10, a predetermined path preferably about an inch wide is described on a floor area 17 by means of a guide line 36. Because the present system does not operate from reflected radiation, guide line 36 need not be formed of a material that forms a sharp visual contrast between the guide line and the surface of the floor to which the guide line is applied. In fact, guide line 36 desirably is virtually invisible under ambient lighting conditions. To provide a means for distinguishing between the guide line and the floor, guide line 36 includes a suitable amount of fluorescent material so that when the guide line is irradiated by ultraviolet light, the fluorescent material fluoresces so as to emit visible light in a predetermined frequency range. The preferred fluorescent material radiates visible light in the blue-green spectrum (approximately 450–500 nanometers) when stimulated by invisible ultraviolet radiation at about 360 nanometers. The visible light is then detected by the guidance system and effective controls are provided to steer the vehicle along the guide line.

Guidance Mechanism

The automatic guidance mechanism 12 employed in floor scrubber 10 comprises a position sensing unit 13 mounted by means of a suitable frame 38 or the like to the pivotal mounting mechanism for wheel 18. Position sensing unit 13 is pivotally movable along with wheel 18 so that if the unit is maintained over the center of the guide line, wheel 18 is continuously placed in a direction such that the vehicle will follow the guide line.

Position sensing unit 13 is adapted to sense the position of the guidance mechanism with respect to the guide line and generate an error signal proportional to the variation of the position of the sensing unit with respect to a predetermined lateral position relative to the guide line. An error output voltage is generated by the sensing unit that is proportional to the displacement distance of the guide line away from the center of the sensing unit.

The error output signal produced by position sensing unit 13 is transmitted by means of lead 40 to automatic control apparatus 15 that steers the vehicle along the guide line in response to the error output signal. Automatic control apparatus 15 includes a servo-amplifier 42 that amplifies the signal from lead 40, and the servo-amplifier drives a reversible steering motor 22 to control the steering of the vehicle. Servo-amplifier 42 is connected to steering motor 22 by means of separate leads 44 and 46 for forward and reverse operation of steering motor 22. The steering motor is connected to pivotable wheel 18 to steer the vehicle by means of a suitable sprocket 24 and drive chain 26. Other types of drive trains could also be employed.

Figure 4A:
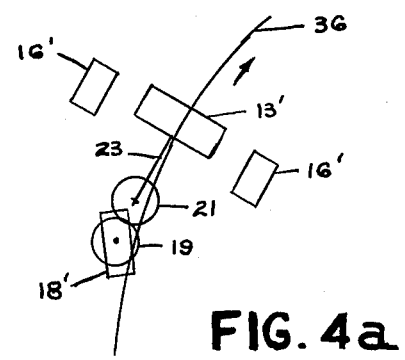
FIG. 4a is a schematic block diagram showing the interconnection between the sensor circuitry and the steering control mechanism in a rear steering three-wheeled vehicle.
Figure 4:
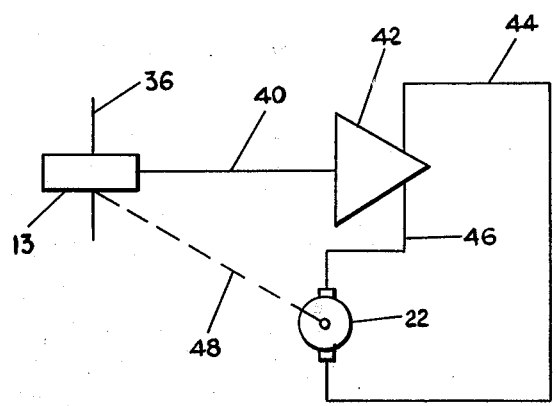
FIG. 4 is a schematic block diagram showing the interaction between the sensor circuitry of the present invention and the servo-operated steering mechanism of the vehicle.

A schematic representation of the manner in which guidance mechanism 12 effects the steering of vehicle 10 is shown in FIG. 4. In that figure, position sensing unit 13 is shown in position directly over guide line 36. Lead 40 is connected to servo-amplifier 42 and servo-amplifier 42 is connected by means of leads 44 and 46 to drive reversible motor 22. Dotted line 48 extends between position sensing unit 13 and motor 22 to show schematically that the steering action effected by the servo-motor maintains the position sensing unit over the center of the guide line.

Dotted line 48 represents an important feature of the present invention, namely, the mechanical feedback provided by the control mechanism to position sensing unit 13. In prior automatic guidance systems, the position sensing apparatus has been mounted in a fixed position on the vehicle, so that the vehicle itself must return to a centered position over the guide line before a "no error" signal is produced by the sensing unit. The problem with this type of system is that the time response characteristics of the system are undesirably slow, and this impairs the ability of a vehicle to quickly and accurately trace a complex guide line.

In accordance with the present invention, mechanical feedback is provided not by the actual movement of the vehicle itself, but by the movement of pivotable steering wheel 18 to a proper steering position. An error signal generated by position sensing unit 13 causes wheel 18 to pivot so that the position sensing unit is maintained over the guide line, thus causing the wheel to continuously follow the position sensing unit along the guide line. By providing the feedback interconnection in the vehicle through the steering mechanism as opposed to vehicle position, the time response characteristics and, hence, the maneuverability and tracking ability of the vehicle are markedly improved.

In the exemplary embodiment described herein, a three wheeled vehicle with a single, front steering wheel 18 is disclosed. The same principles of operation would be employed in a vehicle having two front steering wheels, except that the position sensing unit could be suspended for transverse movement with the turning of the wheels by mechanical linkage interconnected between the mounting mechanisms for the two wheels.

In a rear steering vehicle, such as a vehicle having a tricycle running gear with a single pivotable wheel mounted in the rear and a pair of fixed wheels mounted in the front, the same basic principles apply, but additional mechanical linkage or gearing is necessary in order to compensate for the fact that a rear steering wheel is turned in a direction opposite to the desired direction of the vehicle. One possible interconnection is shown schematically in FIG. 4a, wherein the guidance system is shown in a rear steering three wheeled vehicle having front wheels 16' and a pivotable rear wheel 18'. Rear wheel 18' is connected to a gear 19, and gear 19 is drivingly connected to gear 21. Gear 21 is connected by a frame 23 to sensing unit 13'. When sensing unit 13' becomes displaced from guide line 36, an error displacement signal pivots rear wheel 18' and gear 19 in one direction (e.g., counterclockwise), and this moves gear 21 and sensing unit 13' in the opposite direction (e.g., clockwise) until the sensing unit is again properly positioned over the guide line. Other types of mechanical linkages could be devised to accomplish the same purpose.

Considering the structure of position sensing unit 13 in more detail as shown in FIG. 2, this unit includes a radiation source 50 adapted to make guide line 36 fluoresce at a point immediately below the sensing unit and a sensor mechanism adapted to detect the visible radiation emitted from the guide line and produce an output signal proportional to the variation of the position of the sensing unit with regard to the guide line.

Radiation Source

Figure 3:
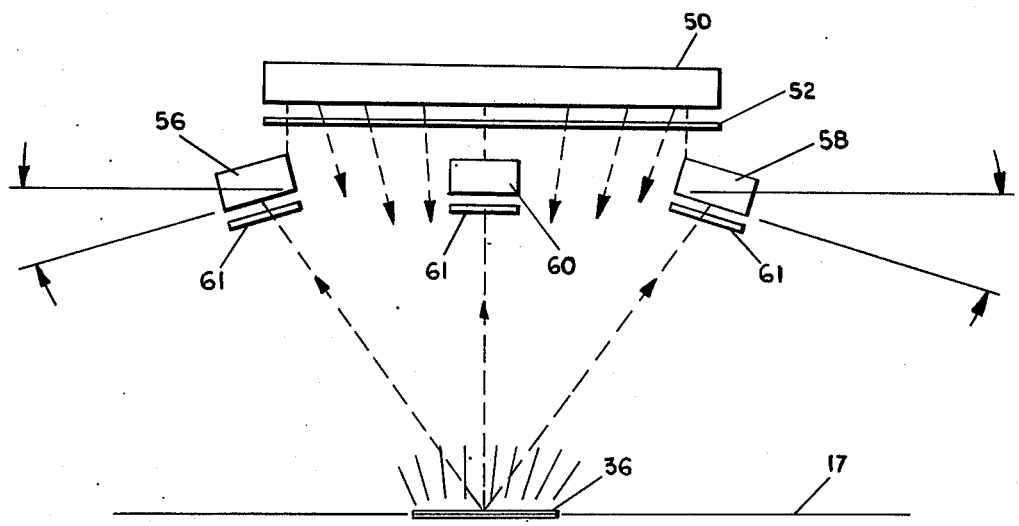
FIG. 3 is a schematic diagram showing the relative positions of the excitation lamp and photocell sensors employed in the guidance system of the present invention.

Radiation source 50 comprises a conventional ultraviolet lamp that emits radiation principally in the ultraviolet frequency spectrum. Pure ultraviolet radiation is invisible to the eye, yet it causes fluorescent material to fluoresce and emit radiation of a frequency that is visible to the eye. As stated above, in the preferred embodiment of the present invention, the fluorescent material selected for use in connection with the guide line is the type of material that fluoresces in the blue-green region of the visible spectrum (approximately 450–500 nanometers). If ultraviolet lamp 50 radiates some visible light in the blue spectrum in addition to the invisible ultraviolet light, suitable filters 52 (FIG. 3) are employed in order to prevent the blue light from being reflected off of the floor and into the sensor means. Therefore, lamp 50 directs only invisible radiation onto the floor and only invisible radiation is reflected from the floor. The only visible radiation produced as a result of the radiation emitted from lamp 50 is fluorescent radiation emitted from fluorescent guide line 36.

This feature of the present invention provides an important advantage over prior art reflected radiation tracing systems, because in reflected radiation systems, the same radiation is reflected from both the background and the guide line being traced, and the radiation reflected from the background minimizes the distinctiveness and the contrast between the guide line and the background surface. This distinction is particularly troublesome when a bright background surface is employed. When a fluorescent system is used, the fluorescent material can be stimulated with invisible light of a second frequency range and the fluorescent material will in turn emit a visible light of a first frequency range. The sensor mechanism can be made selectively responsive to the particular frequency range of visible light emitted by the guide line, such that the sensor is responsive only to the visible radiation of the fluorescent guide line and is not responsive to invisible radiation reflected off the background surface. The contrast between the guide line and the background surface is therefore maximized, thereby providing a marked improvement in reliability over reflected light tracing systems.

Sensor Circuitry

Considering the structure of the sensor circuits in more detail, the sensing unit includes a left photocell 56, a right photocell 58, and a centerline photocell 60 mounted over the guide line. The system is designed so that centerline photocell 60 is positioned directly over guide line 36 and the left and right photocells are positioned equidistant on each side of the guide line. Preferably, the left and right photocells are each spaced about two inches from the centerline photocell and are inclined at an angle of about 15°–18° from a horizontal position. This insures a broad and continuous viewing area for tracking the guide line and provides additional advantages which are discussed below in connection with the AGC feedback circuits. Other positions and viewing angles could work satisfactorily, subject to the relative position requirements discussed in connection with the AGC feedback circuit.

The photocells employed in the preferred practice of the present invention are photoconductors having a relatively slow time constant and having a peak response frequency range that conforms with or at least overlaps the fluorescent guide line. Such photocells typically are slightly responsive to ultraviolet radiation, so filters 61 are employed to filter out ultraviolet radiation reflected from the background surface. Desirably, the photocells are selected so as to have a peak response in the frequency range of the light emitted by the fluorescing guide line, in order to enhance the line distinguishing abilities of the system.

Figure 5:
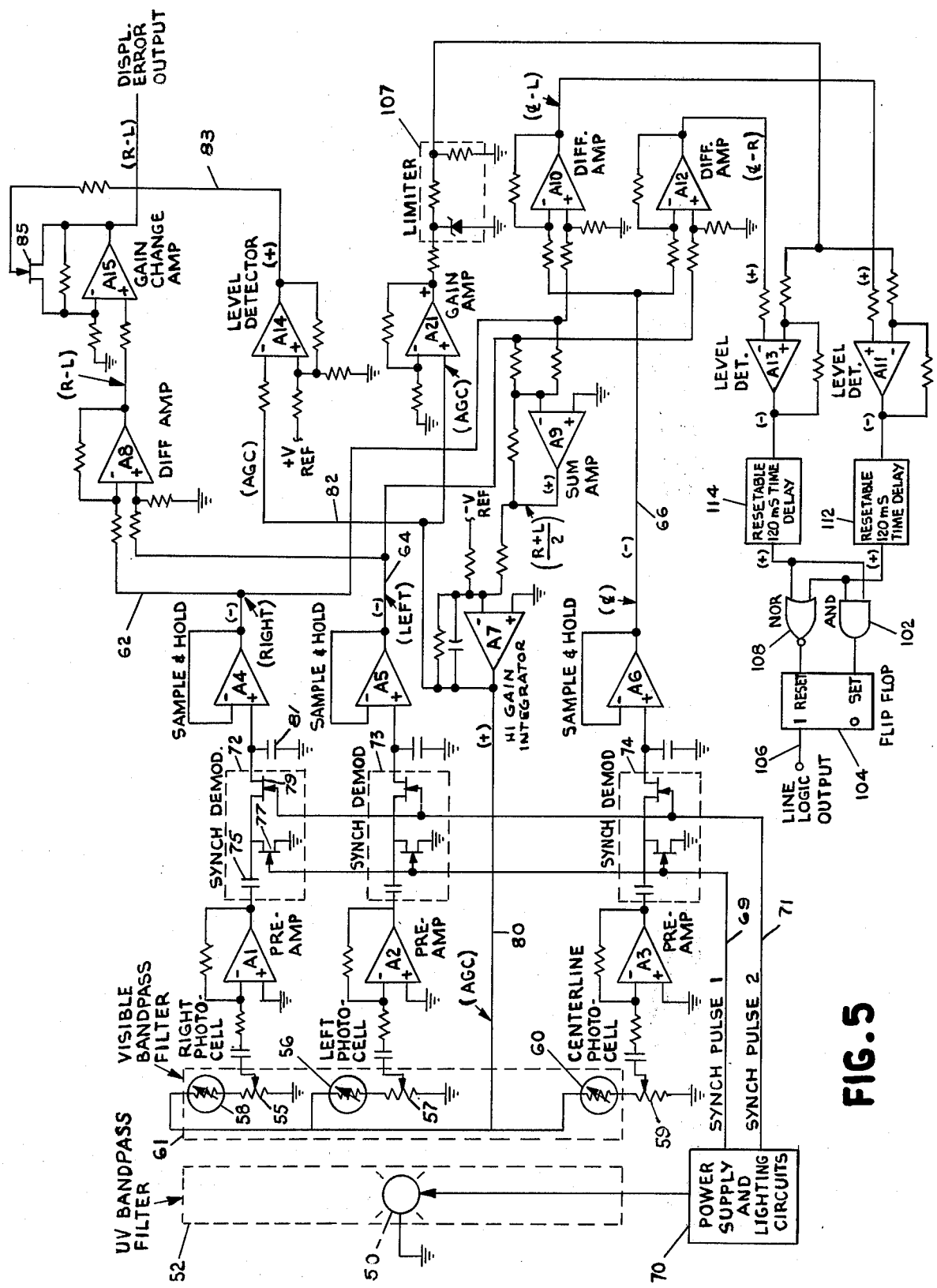
FIG. 5 is a block diagram showing a first embodiment of the sensor and line detection circuitry of the present invention.

In a first embodiment of the sensor circuitry shown in FIG. 5, the photocell signals are sensed as voltage signals across gain adjust resistors 55, 57, and 59 (which provide a means for compensating for gain variation in the photocells), with the voltage signals corresponding to the intensity of the visible light received from the floor. The photocell signals pass first through D.C. blocking capacitors and then are amplified through preamplifiers A1, A2, and A3, respectively. The respective signals then pass through signal demodulation and sample and hold circuits to eliminate the effect of static background illumination, and the remaining signals appear as photocell output signals in leads 62, 64, and 66 for the right, left, and centerline photocells, respectively. The photocell output signals for the right and left photocells are then subtracted in differential amplifier A8. The output of amplifier A8 passes through gain change amplifier A15 (which is discussed below), and this output serves as the error displacement output signal for operation of the steering servoamplifier.

Figure 6:
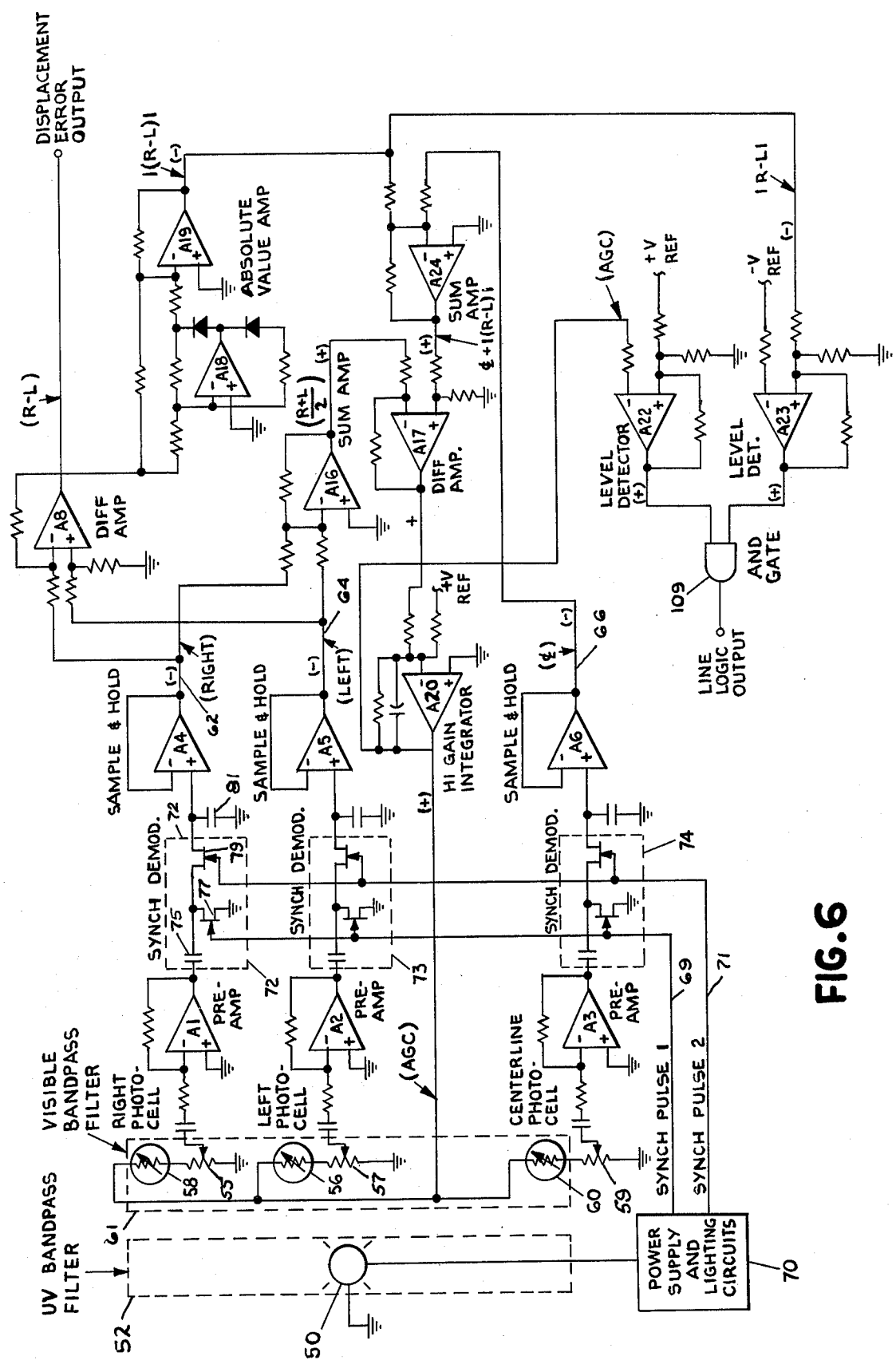
FIG. 6 is a block diagram showing a second embodiment of the sensor and line detection circuitry of the present invention.

The basic differential circuit of FIG. 5 also is employed in the second embodiment of the sensor circuit shown in FIG. 6. For convenience, identical elements are given the same reference numbers in both embodiments.

Modulation Circuits

In order to maximize the effectiveness and reliability of the control apparatus of the present invention, it is important to be able to eliminate all effects of static ambient illumination from the photocell output signals appearing at leads 62, 64, and 66. In order to accomplish this result, the ultraviolet lamp is flashed on and off by power supply and lighting circuits 70 at a predetermined synchronized frequency rate. The photocell outputs are then passed through synchronized demodulators 72, 73, and 74, which strip the lamp induced signals from the background signal and pass the lamp signals through sample and hold amplifiers A4, A5, and A6 to photocell output leads 62, 64, and 66, respectively.

The operation of this modulation circuitry is shown in FIG. 7 which shows the output wave forms at various points in the circuit as a function of time. In FIG. 7a, at the top of this graph, the wave form created by the flashing ultraviolet lamp is shown as a square wave. In the preferred embodiment of the present invention, the frequency of the flashing ultraviolet light is selected to be 144 Hz. This frequency is not critical but is selected at this value to minimize the harmonic overlap between the flashing of the ultraviolet light and the 120 Hz light component of conventional alternating current fluorescent lighting (which appears in background illumination).

Synchronized demodulators 72, 73, and 74 in conjunction with sample and hold amplifiers A4, A5, and A6 effectively measure the difference between the light levels during the time when the ultraviolet light is on and off, thus providing a measure of the increased light due to the fluorescene of the guide line. These differential signals appearing at the outputs of amplifiers A4, A5, and A6 (herein referred to as the photocell output signals) do not include the component of static background illumination. Without a modulation circuit of the type described, variations in the intensity of static background illumination, such as would occur in operating the system under varying lighting conditions or in tracing a line on a variable black and white checkered tile floor, could cause serious variation in the error output signal produced by the guidance system. This in turn would affect the stability and the accuracy of the steering mechanism.

The actual operation of the synchronized demodulators and the sample and hold circuits can best be described with reference to FIGS. 7b, 7c, and 7d. FIG. 7b shows the decrease in the output voltage of preamplifiers A1, A2, and A3 as a function of time. When the ultraviolet light is flashed on and the guide line is caused to fluoresce, the photocells (which are photoconductors in the present invention) begin to decrease in resistance in accordance with the time constant of the photocells. This gradual decrease in resistance is shown at the output of the preamplifiers as a decreasing voltage level. The photocell time constants are slow enough so that the preampiifier outputs appear as gradually decreasing voltages.

Figure 10:
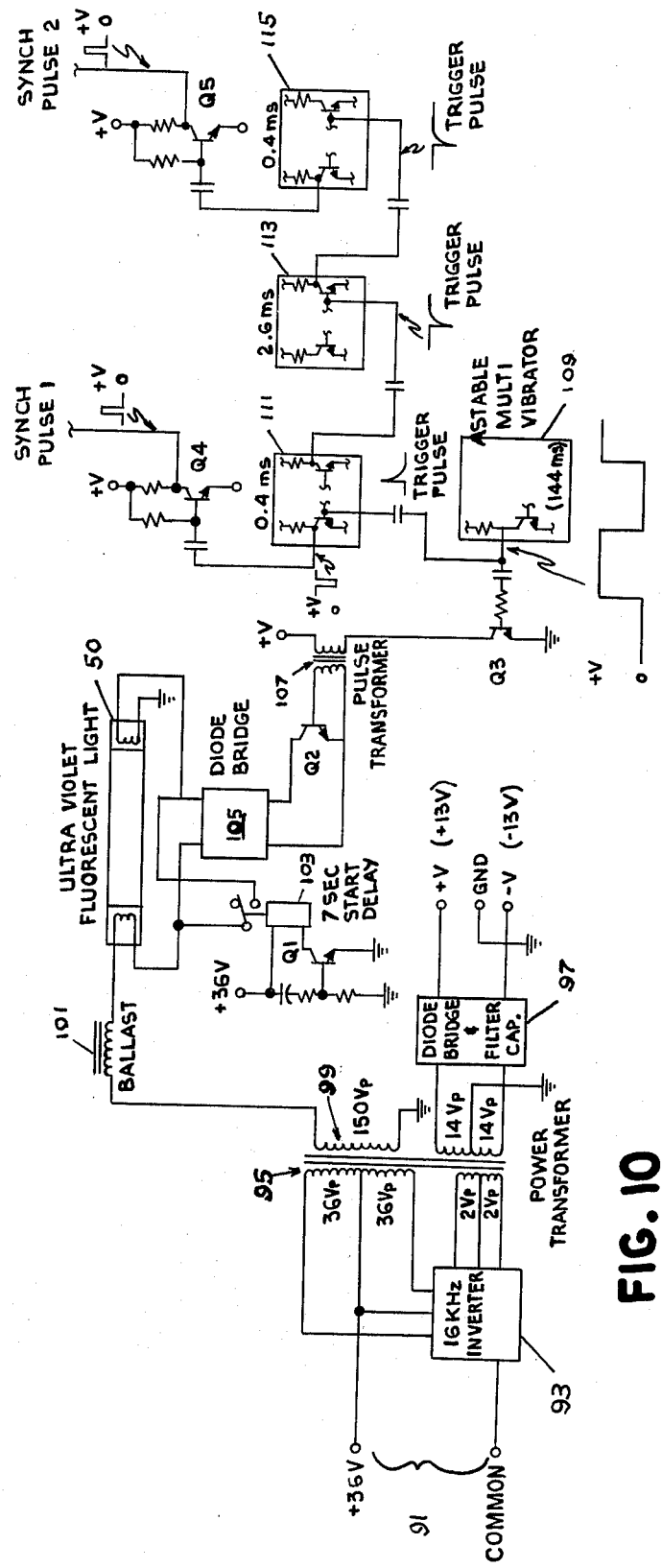
FIG. 10 is a schematic circuit diagram of the power supply and lighting circuits of the present invention.

As shown in FIGS. 5, 6, 7c, the power supply and lighting circuits 70 generate a series of strobe or synch pulses in synchronization with the flashing frequency of the lamp driver, with a first synch pulse being transmitted to the demodulators just after the start of each lamp flashing cycle by a lead 69 and a second synch pulse being transmitted to the demodulators just before the end of each lamp flashing cycle by a lead 71. The circuit details of power supply and lighting circuits 70 are shown in FIG. 10. The primary system operating voltage (36 Volts D.C.) appears across terminals 91 and is converted to 16 kHz A.C. by a 16 kHz inverter 93 and power transformer 95. A diode bridge and filter capacitors 97 rectify the A.C. voltage on the secondary of the power transformer, which then provides the pulse and minus voltage supplies to operate the automatic system.

A high voltage winding 99 on the power transformer, in conjunction with a ballast 101, provides the proper conditions to illuminate the ultraviolet light 50 at 16 kHz. Relay 103 and associated drive transistor Q1 short the light for 7 seconds after power is applied in order to heat the light filaments and allow proper operation when relay 103 becomes de-energized.

A transistor Q2 and an associated diode bridge 105 and pulse transformer 107 short out the lamp at a 144 Hz rate, as determined by a symetrical astable multivibrator 109 and a transistor Q3. This flashes the lamp on-and-off at 144 Hz.

A string of three monostable multivibrators, 111, 113, and 115 (one shots) also are driven by the astable multivibrator and these elements provide the strobe or synch pulses to the synchronous demodulators. A first 0.4 ms pulse produced at the output of transistors Q4 by one-shot 111, initializes the demodulator when the lamps turns on, and a second 0.4 ms strobe pulse produced at the output of transistor Q5 transfers the sensor photocell data to the sample and hold amplifiers 3.0 ms later, just before the lamp turns off.

Each synchronized demodulator comprises a series capacitor 75 connected to a grounded field effect transistor ("FET") 77 and then to a series connected FET 79. FET 77 and FET 79 are both effectively normally open and become closed circuits upon receipt of synch pulses from leads 69 and 71, respectively. Each synchronized demodulator is connected to a grounded capacitor 81 and then to the input of its respective sample and hold amplifier.

The operation of the synchronized demodulation circuit is as follows: When both FETs are open, no signal is transmitted. When a first synch pulse is generated FET 77 is closed for the duration of the pulse (0.4 ms). This causes the output voltage of the photocell preamplifier to be impressed on capacitor 75 and held. When the second synch pulse is generated (3.0 ms after the start of the first pulse), FET 79 is closed, and this causes the difference between the voltage across capacitor 75 (i.e., the voltage at the time of the first synch pulse) and the voltage at the time of the second synch pulse to be registered across capacitor 81. This difference voltage is the input voltage for the sample and hold amplifier. This voltage is reflected at the output of the sample and hold amplifier as a constant D.C. voltage (FIG. 7d), with the D.C. voltage changing only when a subsequent pair of synch pulses cause a new differential voltage to be impressed on capacitor 81.

Although the flashing of the ultraviolet lamp is effective to eliminate virtually all static background illumination, a slight response may be passed through the synchronized demodulators as a result of the beat frequency between the 120Hz fluorescent room lighting and the 144 Hz visible radiation emitted by the fluorescent line (24 Hz component). This is shown in FIG. 7e. The magnitude of this component, however, is relatively small compared to the amount of light effectively blocked out by the modulation circuitry. Further, the minor effect due to the 24 Hz component as a result of the fluorescent room lighting generally is balanced between the left and right photocells, so that the differential amplifier will remove this component from the error output voltage (as shown in FIG. 7f).

The same modulation circuitry is employed in the second embodiment of the sensor circuitry of the present invention shown in FIG. 6. Identical components employ the same reference numbers in both embodiments.

AGC Feedback Circuits

In addition to eliminating the effect of static background illumination by the use of modulation circuitry, additional feedback circuitry is employed in order to further enhance the stability of the system by maintaining a constant ratio between error output voltage versus displacement from the center of the guide line. To accomplish this effect an automatic gain control circuit ("AGC") is incorporated in the circuitry.

In the first embodiment of the present invention shown in FIG. 5, the AGC is designed to maintain a constant summation of the left and right photocell output signals. In order to accomplish this effect, the output voltage of the left and right photocells is fed back through a summation amplifier A9 and the sum of the right and left output signals is compared with a reference voltage in AGC amplifier A7, which is a high gain integrator. The difference between the summation voltage and the reference voltage is fed back through line 80 to the photocell input. This same differential input is fed by lead 82 through level detector amplifier A14 and then by lead 83 to FET 85 in amplifier A15 in order to increase output gain for very dim lines. In a situation where the AGC level exceeds 2.5 volts (i.e., a very dim line) amplifier A15 increases the output gain by a factor of 2 to help maintain a constant deviation gain.

The drawback with this type of circuit, however, is that when the sum of the left and right photocell outputs is maintained at a constant level, the closed loop signal gain varies with the level of fluorescent background illumination. When fluorescent background illumination is high, the feedback circuit lowers the gain, even though there may be no signal variation with respect to signal radiation. This alters the closed loop gain and adversely affects system stability.

In the context of the present invention, even with the benefit of a fluorescent guide line and modulation circuitry, varying fluorescent background illumination causes undesirable variation in the output gain in the system. In order to eliminate the effect of fluorescent background illumination in the signal feedback circuit, the improved feedback circuit shown in FIG. 6 was developed.

This improved feedback circuit maintains a constant difference between the centerline voltage (as modified herein) and the average of the left and right photocell outputs. When the positions of the photocells are adjusted so that they receive approximately the same amount of background illumination from the same viewing area, the difference function eliminates the background illumination component of the total signal and leaves a reference voltage that is dependent only on guide line signal strength.

In the improved feedback circuit, the average of the left and right photocell output signals is produced in summation amplifier A16 and is introduced into a differential amplifier A17. To produce the other input signal to differential amplifier A17, amplifiers A18 and A19 compute the absolute value of the error output signal (i.e., the difference between the right and left photocell signals), and this value is added to the output voltage of the centerline photocell in amplifier 24. This summation signal is introduced into amplifier A17 and the difference between this signal and the average output signal of the left and right photocells is compared with a reference voltage in AGC amplifier A20, which again is a high gain integrator. The difference is the AGC voltage signal, and this signal is fed back to the photocell inputs to maintain a constant closed loop signal gain in the system.

The significance of the improved AGC circuitry in the second embodiment of the present invention is shown in the graphs set forth in FIG. 8. In that figure, the left, right, and centerline photocell output signals are shown as functions of displacement of the guide line from a position immediately below the centerline photocell. Line 86 shows the average of the left and right photocell signals, and line 88 shows the error output signal (i.e., the difference between the left and right photocell signals). The sum of the centerline photocell output signal and the error output signal 88 is shown by line 90. The difference between lines 90 and 86 represents the AGC voltage that is maintained as a constant in the present invention.

In order to maintain a constant closed loop gain with the improved AGC circuit without reference to background illumination, it is necessary that the centerline photocell be positioned such that the background illumination received by it is effectively the same as the background illumination received by the left and right photocells when the guide line is centered. Since the intensity of illumination received by a photocell is a function of the photocell viewing area from which the illumination is received and the effective distance through which the illumination passes before it is received by the photocell, the background illumination received by each photocell with the guide line immediately below the centerline photocell can be made equal by proper positioning of the photocells and, if necessary, by placing appropriate shields on the photocells. In the preferred embodiment of the present invention, the left and right photocells are each positioned about two inches away from the centerline photocell and the left and right photocells are inclined at an angle of about 15°–18° with respect to the horizontal. Some additional screening is necessary in order to achieve the desired effect of making the fields of view of the three sensors equal with respect to the background area when the guide line is positioned immediately below the center sensor.

With the photocells balanced in this manner, the difference between centerline photocell output and the average of the side photocells eliminates the effect of background illumination from the feedback signal when the guide line is approximately centered.

Although the use of a feedback signal comprising the difference between centerline output and the average of the side outputs is effective to maintain a constant closed loop signal gain without interference from background illumination, it can be observed from FIG. 8 that the signal gain will remain constant only as long as the guide line is approximately centered and the effective background illumination received by the photocells is equal. When the guide line is displaced to either side of center, the effective amount of background illumination received by each photocell is changed, thus permitting a component of background illumination to enter the feedback signal. Also, the difference between centerline voltage and the average of the side photocell output becomes smaller. The error introduced by displacement of the guide line can be avoided at least partially by making the time constant of the AGC circuit sufficiently slow and the reaction time and accuracy of the servo-control sufficiently high so that the vehicle will be returned to a zero error position before the AGC circuit reacts to change the feedback signal because of displacement.

In order to avoid closed loop gain variance due to the decreasing difference between centerline output and the average side photocell output with increasing displacements away from the centerline, the absolute value of the error output signal can be added to the centerline voltage before subtracting the average of the left and right photocells. As shown in FIG. 8, by modifying the centerline signal in this manner, the AGC voltage can remain relatively constant even for substantial displacements of the guide line away from the centerline.

To summarize the object and effect of the improved AGC feedback signal on the present invention, if the centerline photocell is positioned so that it receives approximately the same background viewing illumination as the photocells on each side of it, and the centerline photocell output (as adjusted by adding to it the sum of the absolute value of the difference between the right and left photocells) is subtracted from the average value of the left and right photocell outputs, the differential is a relatively constant voltage that is independent of the level of background illumination present.

The importance of maintaining a relatively constant ratio between error output voltage and displacement is that the stability of the vehicle steering system is dependent upon the maintenance of the gain of the system at a relatively constant level in order to provide a quick steering response to directional variation. It is necessary that the gain of the servo-amplifier be maintained at a high level, yet this level cannot be too high or the steering response would be too quick and the system will oscillate. Oscillation might be observed in this system by the continuous wobbling or fluctuation of the vehicle back and forth across the guide line instead of stabilizing on the center of the guide line. On the other hand, if the gain is too low, the steering response may be too slow to bring the vehicle back into alignment with the guide line at all on sharp turns, with the result being that the vehicle may wander completely away from the guide line. To maintain the closed loop gain and the response of the servo-system at the proper level, it is necessary that the level of signal output versus displacement be maintained at a constant level.

The principal purpose of the feedback signal is to prevent variations in line brightness or contrast or fluctuation in the level of ultraviolet radiation from affecting output gain. Thus, when signal level drops, the AGC boosts gain and when the signal level rises, the AGC lowers gain. By making the feedback circuit independent of background illlumination, gain control becomes responsive (as it should) only to changing conditions in the displacement error signals computed with the photocell output in response to guide line variations.

Line Detection Circuitry

Another important feature of the present invention is the incorporation of line detection circuitry to prevent the system from operating unless the vehicle and the vehicle guidance mechanism are placed over a valid guide line. If the system did not incorporate line detection circuitry, the automatic guidance system could operate the vehicle even if the vehicle were not on a valid guide line. Thus, there would be no directional control to the vehicle at all and the vehicle could wander away in any direction.

A first embodiment of a line detection system is shown in FIG. 5. In that embodiment a valid line is first indicated when the centerline photocell output is greater than both the left and right photocell outputs. In order to achieve this effect, the difference between the centerline output and the left output is computed in amplifier A10 and the difference between the centerline photocell output and the right photocell output is computed in amplifier A12. These difference voltages are applied to level detector amplifiers A11 and A13, wherein they are compared with a suitable reference voltage. To initially capture a line, the centerline output must be greater than both the left and right channels and the signal strength must be of sufficient strength to warrant a capture. This condition is transmitted to AND gate 102, which actuates a flip-flop 104 to produce a valid line output signal at terminal 106. This assures that the programmed line is bright enough and of proper width. This also prevents false line indication such as might be produced by a piece of paper or a black and white checkerboard tile pattern. Once the line has been captured, the logic reverts to the requirement that the centerline output be greater than either the left or right channel, as indicated by NOR gate 108.

If this condition is not met, NOR gate 108 causes flip-flop 104 to indicate an invalid line.

The purpose of having separate logic conditions for initially capturing a line and indicating a valid line once the line has been captured is to increase the effective field of view once the line has been captured. This prevents the generation of a no-line indication in situations such as when the vehicle is traveling at a high speed and turning a sharp radius on a dim line.

As stated above, the difference between the centerline output and the left and right outputs are compared in level detectors A11 and A13 to a suitable reference voltage. This voltage, in ordinary circumstances, could be any predetermined voltage level which is chosen to satisfy the condition that the centerline output signal be sufficiently greater than the left and right output signals to warrant a positive output signal. However, on extremely bright lines, the difference between the centerline output and the output of the side sensors decreases because of the nonlinear response of the photocells. Under these conditions it is desirable to reduce the level detector trip point. Thus, the reference voltage employed is the AGC output signal through an amplifier A21 and an associated limiter 107. These components effectively reduce the trip points for extremely bright lines.

Because of the different viewing angles of the center photocell with respect to the left and right photocells, the difference outputs from amplifiers A10 and A12 contain beat frequency interference from the 120 Hz room fluorescent lighting. To detect dim programmed lines, level detectors A11 and A13 must be set to detect small brightness differences. To prevent false line indications because of the 24 Hz beat frequency output caused by the 120 Hz fluorescent fixtures, resetable 120 ms time delays 112 and 114 are used at the output of the level detectors to assure that the outputs remain valid for at least 120 milliseconds.

A second embodiment of a line detector system is shown in FIG. 6. In this embodiment, the AGC output signal is employed for the purpose of determining a valid line. It can be observed from the nature of the AGC function (i.e., to maintain a constant voltage differential between the centerline output voltage and the average output voltage of the side photocells) that if the AGC amplifier is working in its permissible dynamic range, a valid line must exist, because the difference between the centerline output and the side sensors can be maintained at a predetermined constant. Therefore, the presence of a valid line is detected by sensing the AGC voltage. If, on the other hand, there is no valid line to be detected, the AGC amplifier cannot maintain a constant voltage differential, and the amplifier rapidly becomes saturated.

In order to employ the AGC voltage as a valid line indicator, the output of the AGC voltage is connected to a level detector amplifier A22 and is compared therein to a reference voltage. The voltage is adjusted so that if the AGC amplifier output approaches saturation, level detector amplifier emits a negative line indication.

This negative line indication could itself be used as a control signal for controlling the operation of the automatic line follower. Alternatively, this output can be connected to an AND gate 109 along with appropriate circuitry for limiting the permissible displacement range for initial capture of a guide line. In the preferred system of the present invention, without additional limiting, the electronics can detect a valid line as far as 2½ inches away from the desired centerline. This can cause a dramatic capturing reaction when the automatic control device initially engages the system. To prevent this from occurring, a displacement limiting device is incorporated into the line detection circuitry. This displacement limiting device employs the absolute difference between the right and left photocell outputs and compares this difference with a suitable reference voltage (e.g., one volt) in level detector amplifier A23. Whenever the difference between the right and left photocell outputs exceeds this predetermined reference voltage, a negative line signal is transmitted to AND gate 109 and a no-line output signal is produced. In the preferred practice of the present invention, the reference voltage for amplifier A23 is adjusted so that the displacement of the tracking mechanism must exceed about one inch on either side of the guide line before an invalid line will be indicated.

Automatic Scrubber Operation

Figure 9:
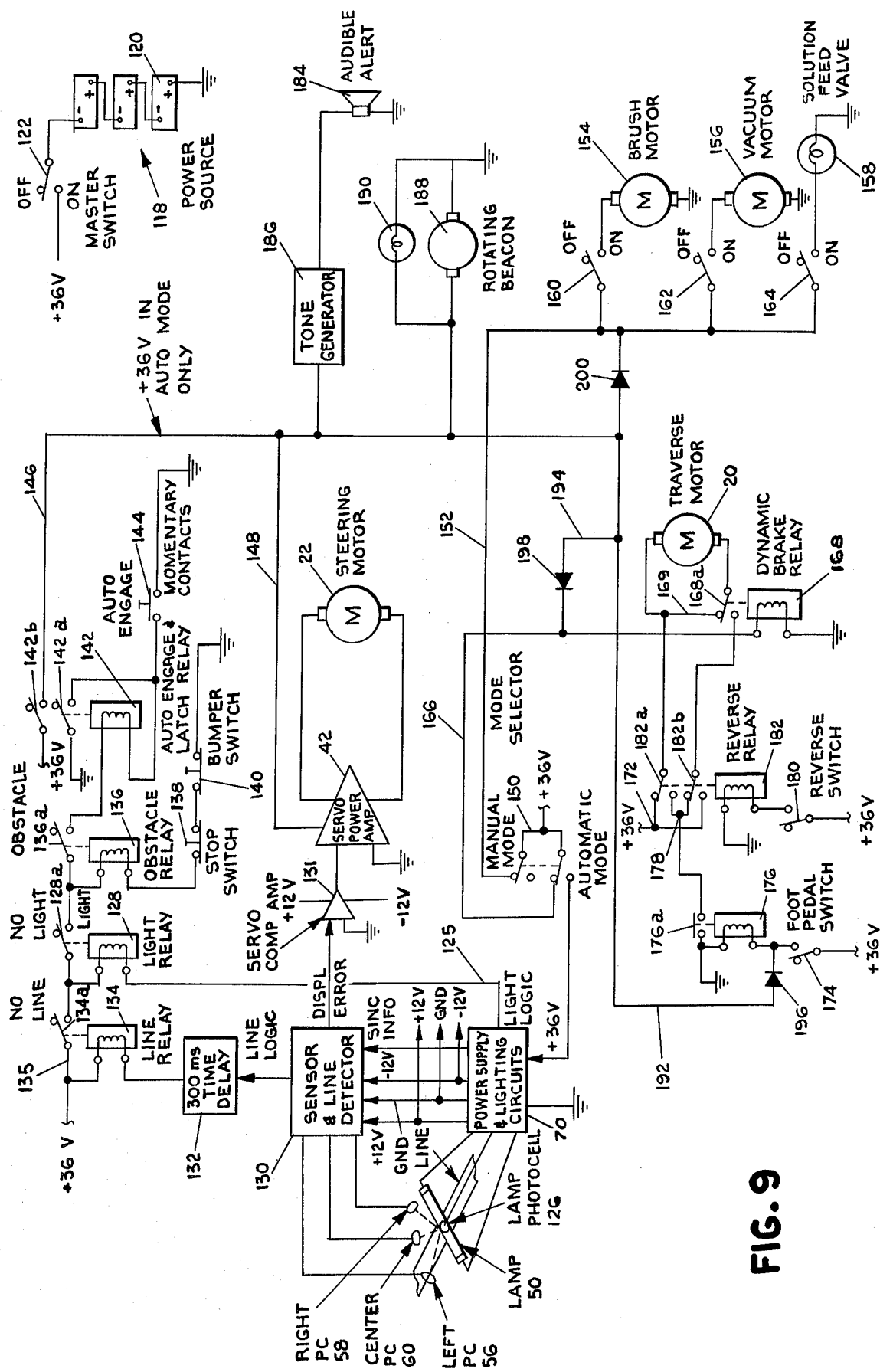
FIG. 9 is a schematic block diagram showing the guidance and control circuitry of an automatic floor scrubber operated by the vehicle guidance system of the present invention.

In FIG. 9, a block diagram of the entire electrical circuitry of the automatic scrubber 10 is shown. Starting with a power source 118 shown in the upper right hand corner in this drawing, since this is a remote control, indoor, industrial vehicle, the power source is a series of DC batteries 120 connected in series in order to produce a 36-volt power supply. A master switch 122 in series with the batteries controls the power supply to all elements of this system.

Starting at the left hand side of the drawing in describing the various elements of the system, lamp 50 is driven by means of power supply and lighting circuits 70, shown schematically in block form in FIG. 9 and shown in detail in FIG. 10. A lamp photocell 126 is employed in addition to the other photocells in order to indicate whether the lamp is on. If the lamp is not on, a light relay 128 connected to power supply 70 by lead 125 breaks the circuit and prevents the system from operating.

Figure 11:
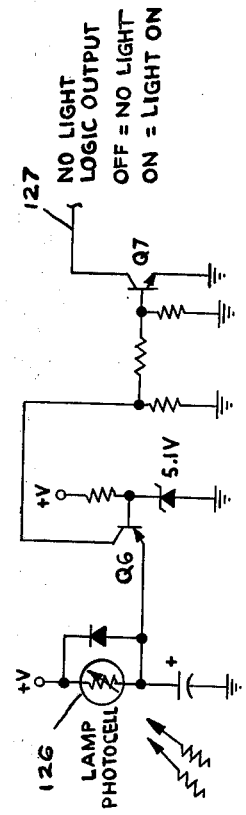
FIG. 11 is a schematic circuit diagram of the light detecting circuit of the present invention.

The lamp detection circuit is shown as a portion of the schematic block diagram of the power supply and lighting circuits 70 in FIG. 9, and the details of this circuit are shown in FIG. 11. As shown in that FIG. 11, lamp photocell 126 is connected through transistors Q6 and Q7 to produce a logic signal output at terminal 127, wherein the transistor Q7 is turned off when there is no light and is turned on when the light is on.

Photocells 56, 58, and 60 comprising the guide line sensing mechanism of the present invention are connected to the sensor and line detector circuits which are shown in block form as element 130. The displacement error output signal (i.e., the output of differential amplifier A8 in FIGS. 5 and 6) is connected to servo-power amplifier 42 through a servo compensation amplifier 131, and this servo power amplifier drives steering motor 22 in either direction. The output of the line detection system, as indicated in FIGS. 5 or 6 to be the "line logic output" is fed through a 300 millisecond time delay 132 to a line relay switch 134 which operates contacts 134a in line 135. Line relay switch 134 breaks the circuit connection in line 135 if an invalid line is indicated. The 300 millisecond time delay prevents minor breaks in the line or minor voltage fluctuations from indicating a no-line situation.

Relay switches 134a and 128a are connected in series with an obstacle relay 136. Obstacle relay 136 is deactuated by either stop switch 138 or by a bumper switch 140. Stop switch 138 is a manually operated stop switch which can be actuated by an operator in an emergency or similar situation. Bumper switch 140 is an electrical contact switch on the bumper or outer perimeter of the vehicle, which is actuated whenever the vehicle strikes an obstacle. Bumper switch 140 typically could be formed of a substance called "touch-tape", which is a tape material that can be applied to the exterior of a vehicle and which makes a contact between two terminals when pressure is applied to the tape. The purpose of bumper switch 140 is to effect the automatic deactuation of the control system and forward drive system whenever a vehicle comes in contact with an obstacle in the path of its guide line.

Line relay 134a and light relay contacts 128a are connected in series with obstacle relay contacts 136a, and these contacts are all connected in series with an auto engage and latch relay 142, and an auto engage momentary actuation switch 144, which is connected to a ground. When 36 volts are applied to line 135 and the line relay, light relay, and obstacle relay switches are all closed, the automatic mode of the apparatus can be engaged by pressing the auto engage switch momentarily. This closes the contact and energizes auto engage and latch relay 142. The engagement of the relay 142 closes the associated relay switches 142a and 142b. Since switch 142a is grounded, the release of auto engage switch 144 does not break the circuit but leaves the coils in an energized state. Closing contacts 142b impresses 36 volts along lead 146 and this provides the operating voltage for the entire system.

Before contacts 142b can be closed, it is necessary first that the machine be placed in its automatic mode by means of mode selector switch 150. Mode selector switch 150 has two positions, an automatic mode position and a manual mode position (shown in FIG. 9). When in manual mode position, the operating voltage is connected through branch 152 to a brush motor 154, vacuum motor 156, and a solution feed valve 158, each of which is independently actuatable by manual switches 160, 162, and 164, respectively. A separate output lead 166 from mode selector switch 150 leads to ground through a dynamic brake relay 168. When this relay switch is actuated by moving the mode selector switch to its manual position, contacts 168a move from a position wherein circuit 169 short circuits traverse motor 20 to a position wherein the motor may be driven by the 36-volt power supply applied at terminal 172. The purpose of providing a short circuit for the traverse motor when the motor is to be deactuated is that the short circuit causes the motor to act as a generator and provides dynamic braking to bring the motor to a halt.

In order to complete the voltage connection between the power supply applied to terminal 172 and the traverse motor, it is necessary first to depress a foot pedal switch 174. The depression of this switch actuates relay 176 which closes contacts 176a, thus completing the circuit by connecting terminal 178 to ground.

In order to reverse the direction of the vehicle when the vehicle is in its manual mode, a foot pedal reverse switch 180 is depressed, and this actuates relay switch 182. This in turn switches the contacts 182a and 182b of the relay switch to a position wherein the 36-volt power suppply is applied to the traverse motor in an opposite direction.

When mode selector switch 150 is placed in automatic mode position, the 36 volt source voltage is impressed upon the power supply and lighting circuits 70. This will effect the closing of line relay switch 134 and light relay switch 128 if a valid line is detected and if the light is not burned out. At this point, auto engage switch 144 can be engaged momentarily in order to close contacts 142a and 142b. This impresses 36 volts in the circuit through lead 146. Once the auto engage switch has been depressed, power to the servo power amp is provided through lead 148, and voltage is applied to an audible alert signal 184 through a tone generator 186 in order to audibly indicate that the machine is in operation. Another safety device is a rotating beacon including a motor 188 and light signal 190 in parallel. The rotating beacon also is actuated by depressing auto engage switch 144. Relay switch 176 and contacts 176a are actuated without the depression of foot pedal switch 174 by applying the voltage in line 146 to relay 176 through line 192. Similarly, the dynamic brake relay switch is actuated by applying the input voltage to the brake relay through lead 194. Diodes 196 and 198 are inserted in leads 192 and 194 respectively in order to isolate these leads when the load selector switch is in its manual position.

When auto engage switch 144 is depressed, the 36-volt power supply is similarly connected through diode 200 to lead 152 which powers the brush motor, vacuum motor, and solution feed valve. Switches 160, 162, and 164 still have to be manually actuated before these elements are placed into operation.

The operation of the apparatus of the present invention should be apparent from the foregoing description. Briefly summarizing this operation, when the floor scrubber is to be actuated manually, the operator places the mode selector switch in its manual position and mounts the floor scrubber. The traverse motor is actuated by depressing foot pedal switch 174 and the brush motor, vacuum motor, and solution feed valve are actuated manually. Steering is effected manually and none of the automatic systems are in operation. In order to switch the system to automatic mode, the mode selector switch is moved to its automatic mode position, and the auto engage button is depressed. The operator does not have to depress foot pedal switch 174, but he still must actuate the brush motor, vacuum motor, and solution feed valve switches manually. In either case, master switch 122 must be actuated before any power can be applied to the system, whether the system is in its manual or automatic mode.

When the system is operating in its automatic mode, the system will automatically shut down if a no-line indication is received by line relay 134; if the light relay 128 indicates that the ultraviolet lamp is not lit; if the operator depresses a stop switch 138, or if the vehicle comes in contact with an obstruction. Suitable warning lights are employed in the system in order to indicate the reason why the system has shut down, and when this condition has been rectified, the system can be reactuated by simply depressing the auto engage switch a second time.

It should be understood that the foregoing embodiments of the present invention are merely exemplary and the preferred practice of the present invention and that various changes and modifications may be made in the arrangements and details of construction of the embodiments described herein without departing from the spirit and scope of the present invention.

The embodiments of the invention in which an exclusive property of privilege is claimed are defined as follows:

1. In a vehicle guidance means for guiding a vehicle along a guide line, wherein guidance system radiation means causes the guide line to emit or reflect a guidance signal, sensor means senses the guidance signal and produces a differential error output signal representative of the deviation of the vehicle position from the guide line, and control means automatically controls the position of the vehicle in accordance with the error output signal, the improvement comprising:

feedback means for maintaining a generally constant ratio between error output signal strength and displacement of the guide line from a predetermined centerline position, regardless of the strength of background radiation, said feedback means maintaining said ratio generally constant, as long as the vehicle is following the guide line and the guidance signal is stronger than the signal produced by background radiation when the radiation means is switched on;

modulation means for modulating the guidance signal with a predetermined modulation signal, said modulation means modulating the guidance signal by switching the radiation means on and off at synchronized intervals, the modulation means further generating first and second synchronized pulse signals once each cycle, the first synchronized pulse being generated at a first time interval representative of the time when the radiation means is switched on and the second synchronized pulse being generated at a second time interval representative of the time when the radiation means is switched off, each time interval being a relatively small portion of the total time the radiation means is switched on and off each cycle; and demodulation circuit means for demodulating the error output signal of the sensor means so as to eliminate the effects of static background radiation and the modulation signal from the error output singal, thus limiting the error output signal to the output signal produced by the guidance signal, said demodulation circuit means comprising synchronized demodulation means for measuring the level of the output signal of each sensor means during each first and second time interval and measuring the difference between said signals, said demodulation circuit further comprising sample and hold amplifier means for producing and holding a DC output signal at a level equal to said difference until the value of the difference signal changes in a subsequent cycle.

2. Vehicle guidance means as claimed in claim 1 wherein:

the change in value of the sensor means output signal lags the change in the guidance signal in accordance with the time constant of the sensor means; and the demodulation means measures the difference between the sensor means output signals just after the radiation means has been switched on and just before the radiation means is switched off.

3. Vehicle guidance means as claimed in claim 1 wherein:

the modulation means generates a first synchronized pulse at a selected time when the radiation means is on and a second synchronized pulse at a selected time when the radiation time is off;

the synchronized demodulation means comprises a first capacitor means connected in series with the output of the sensor means, a grounded first field effect transistor means connected to the output of the first capacitor means, a series-connected second field effect transistor means connected to the output of the first capacitor means and a grounded second capacitor means connected to the output of the second field effect transistor means, both field effect transistor means being normally non-conductive, the first field effect transistor means being rendered temporarily conductive by one synchonized pulse and the second field effect transistor means being rendered temporarily conductive by the other synchronized pulse; and the sample and hold amplifier means is connected across the second capacitor means and produces a DC output signal representative of the magnitude of the signal across the second capacitor means.

4. Vehicle guidance means for guiding a vehicle along a guide line comprising:

guidance system radiation means for causing the guide line to emit or reflect a guidance signal;

sensor means for sensing the guidance signal and producing a differential error output signal representative of the deviation of the vehicle position from the guide line, the sensor means producing separate output signals representative of guidance signal intensity at at least three different positions with respect to the guide line, said positions being on the left and right sides of the guide line and a center position over the guide line when the guide line is centered with respect to the sensor means, the sensor means being positioned in the vehicle such that approximately the same amount of background radiation is received at all three positions when the guide line is centered with respect to the sensor means;

control means for automatically controlling the position of the vehicle in accordance with the error output signal;

feedback means for maintaining a generally constant ratio between error output signal strength and displacement of the guide line from a predetermined centerline position, regardless of the strength of background radiation, said feedback means maintaining said ratio generally constant as long as the vehicle is following the guide line and the guidance signal is stronger than the signal produced by background radiation when the radiation means is switched on, said feedback means maintaining said constant ratio by maintaining a constant difference between the output signal from the center position and the output signal from the average of the output signals from the other positions when the guide line is centered with respect ot the sensor means, said feedback means including means for modifying the output signal from the center position by adding to it the absolute value of the difference between the left and right position output signals, the difference between this modified center position output signal and the average of the left and right position output signals being the difference signal maintained at a substantially constant level by said feedback means.

5. Vehicle guidance means as claimed in claim 4 wherein:
the radiation means is adapted to cause the guide line to emit or reflect a guidance signal in the form of radiation capable of being sensed by a photocell; and
the sensor means comprises separate left, right and center line photocells positioned respectively at the left, right and center positions with respect to the guide line.

6. Vehicle guidance means for guiding a vehicle along a guide line comprising:
guidance system radiation means for causing the guide line to emit or reflect a guidance signal;
sensor means for sensing the guidance signal and producing a differential error output signal representative of the deviation of the vehicle position from the guide line, the sensor means being adapted to produce separate output signals representative of guidance signal intensity at at least three different positions with respect to the guide line, said positions being on the left and right sides of the guide line and a center position over the guide line when the guide line is centered with respect to the sensor means, the sensor means being positioned in the vehicle such that approximately the same amount of background radiation is received at all three positions when the guide line is centered with respect to the sensor means;
control means for automatically controlling the position of the vehicle in accordance with the error output signal;
feedback means for maintaining a generally constant ratio between error output signal strength and displacement of the guide line from a predetermined centerline position, regardless of the strength of background radiation, said feedback means maintaining said generally constant ratio as long as the vehicle is following the guide line and the guidance signal is stronger than the signal produced by background radiation when the radiation means is switched on, said feedback means maintaining said generally constant ratio by producing a feedback signal to the senor means that maintains a constant difference between the output signal from the center position and the output signal from at lest one or the average of the other positions when the guide line is centered with respect to the sensor means; and
line detection means for preventing the operation of the vehicle guidance means whenever the feedback signal exceeds a predetermined level.

7. Vehicle guidance means as claimed in claim 6 wherein the line detection means is further adapted to prevent operation of the vehicle guidance means if the absolute difference between the sensor means output signals at the left and right positions exceeds a predetermined value.

8. Vehicle guidance means for guiding a vehicle along a guide line comprising:
guidance system radiation means for causing the guide line to emit or reflect a guidance signal;
sensor means for sensing the guidance signal and producing a differential error output signal representative of the deviation of the vehicle position from the guide line, the senor means being adapted to produce discreet output signals representative of guidance intensity at at least three positions with respect to the guide line, two of said positions being to the left and right of the guide line and the third position being such that a predetermined relationship exists between the output signals representative of the third position and at least one of the other positions when the vehicle guidance means is positioned over the guide line, the sensor means being positioned in the vehicle such that approximately the same amount of background radiation is received at all three positions when the guide line is centered with respect to the sensor means;
control means for automatically controlling the position of the vehicle in accordance with the error output signal;
feedback means for maintaining a generally constant ratio between error output signal strength and displacement of the guide line from a predetermined centerline position, regardless of the strength of background radiation, said feedback means maintaining said generally constant ratio as long as the vehicle is following the guide line and the guidance signal is stronger than the signal produced by background radiation when the radiation means is switched on, said feedback means maintaining said generally constant ratio by maintaining a predetermined relationship between the sensor means output from the third position and at least one or a combination of the other positions at least when the guide line is centered with respect to the sensor means, said feedback means receiving an error signal from the sensor means that is representative of the existing relationship between the sensor means output and generating a feedback signal to the sensor means to correct the relationship to the extent necessary to maintain said predetermined relationship, at least one of said error and feedback signals increasing to a predetermined level when the vehicle is not following a guide line or the guidance signal is not stronger than the signal produced by background radiation when the radiation means is switched on; and
line detection means for preventing the operation of the vehicle guidance means whenever at least one of said error and feedback signals increases to said predetermined level.

* * * * *

UNITED STATES PATENT AND TRADEMARK OFFICE
CERTIFICATE OF CORRECTION

PATENT NO. : 3,970,840
DATED : July 20, 1976
INVENTOR(S) : Carl DeBruine

It is certified that error appears in the above-identified patent and that said Letters Patent are hereby corrected as shown below:

Column 10, line 39, delete "pulse" and substitute therefor --plus--.

Column 10, line 60, delete "lamps" and substitute therefor --lamp--.

Claim 3, column 20, line 2, delete "time" and substitute therefor --means--. (second occurrence, after "radiation").

Claim 6, column 21, line 47, delete "lest" and substitute therefor --least--.

Signed and Sealed this

Twenty-sixth Day of October 1976

[SEAL]

Attest:

RUTH C. MASON
Attesting Officer

C. MARSHALL DANN
Commissioner of Patents and Trademarks